UNITED STATES PATENT OFFICE.

CLIFFORD RICHARDSON, OF NEW YORK, AND CHARLES N. FORREST, OF BROOKLYN, NEW YORK, ASSIGNORS TO THE BARBER ASPHALT PAVING COMPANY, OF PHILADELPHIA, PENNSYLVANIA, A CORPORATION OF WEST VIRGINIA.

BITUMINOUS COMPOSITION.

No. 853,117.        Specification of Letters Patent.        Patented May 7, 1907.

Application filed February 17, 1906. Serial No. 301,599.

*To all whom it may concern:*

Be it known that we, CLIFFORD RICHARDSON, residing in the borough of Manhattan, in the city, county, and State of New York, and CHARLES N. FORREST, residing in the borough of Brooklyn, in the county of Kings and State of New York, have invented certain new and useful Improvements in Bituminous Compositions, of which the following is a specification.

The invention relates to an improvement in such compositions as are used in roofing, waterproofing, painting, or similar purposes for which native bitumens or their products are employed, involving their exposure to sunlight and to the elements.

The invention is based upon the discovery that native bitumens in a relatively pure state are injuriously affected by the rays of the sun (especially actinic rays) and the elements, so that when they are used in the form of a protective coating for roofs or for structural or other forms of steel or iron where they are exposed to the sunlight, they are not sufficiently resistant to afford the protection for which they are used.

Now we have discovered that the presence in the native bitumens of pure graphitic carbon in the form of a flaky powder renders them resistant to sunlight and improves them in other respects. This is because graphite is impenetrable to the actinic rays which injuriously affect the bitumen.

In practicing our invention, we treat the bitumen, while in a molten condition, with from 25 % to 50 % of the purest form of graphite available, such as the flake graphite produced by the Acheson process, until the components are thoroughly mixed. It is then permitted to cool and in this state is in proper condition for use in the various processes to which native bitumens are applied, and which involves open air exposure, such as the manufacture of roofing materials, paints, protective coatings, and other out of door asphaltic surfaces.

We are aware that it has been proposed to mix lamp black with asphalt for the purpose of rendering the same more elastic and improving its wearing properties. But it is impossible to incorporate more than 15 % of lamp black with the native bitumens if they are to retain their valuable property of liquefying by heat, and this small proportion does not materially increase the durability of these bitumens when exposed to sunlight and the elements.

Having thus fully described our invention, we claim and desire to secure by Letters Patent:—

1. A protective substance which resists the injurious effects of the sun's rays comprising a native bitumen in combination with from 25 to 50 % of flaky graphitic carbon.

2. The process of rendering a relatively pure native bitumen less susceptible to sunlight, and therefore better adapted for use as an open air protective coating, which consists in intermixing with the bitumen sufficient graphitic carbon to materially intercept actinic rays.

In testimony whereof, we have hereunto signed our names, at New York city in the State of New York this 15th day of February 1906.

CLIFFORD RICHARDSON.
    CHARLES N. FORREST.

Witnesses:
    RICHD. H. PARKER,
    M. P. TUNIS.